US005147170A

United States Patent [19]
Detrick

[11] Patent Number: 5,147,170
[45] Date of Patent: Sep. 15, 1992

[54] POWER-DRIVEN ADJUSTABLE EQUIPMENT RACK CARRIER

[75] Inventor: John E. Detrick, Vero Beach, Fla.

[73] Assignee: Hi-Tech Handler Corp., Melbourne, Fla.

[21] Appl. No.: 597,078

[22] Filed: Oct. 15, 1990

Related U.S. Application Data

[63] Continuation-in-part of Ser. No. 227,667, Aug. 2, 1988, Pat. No. 4,963,070.

[51] Int. Cl.[5] .......... B60P 1/16
[52] U.S. Cl. .......... 414/492; 280/763.1; 414/498; 414/635; 414/673; 414/786; 180/19.1
[58] Field of Search .......... 414/786, 491, 492, 540, 414/546, 673, 632-638, 469, 477, 498; 280/763.1, 765.1, 43.12; 180/19.1, 19.2, 19.3

[56] References Cited

U.S. PATENT DOCUMENTS

| | | | |
|---|---|---|---|
| 505,749 | 9/1893 | Cardarelli | 414/633 |
| 1,719,197 | 7/1929 | Schlothan | 414/469 X |
| 2,726,115 | 12/1955 | Babcock et al. | 414/477 X |
| 2,962,180 | 11/1960 | Vossenberg | 414/635 |
| 3,054,522 | 9/1962 | Peck | 414/635 |
| 3,071,270 | 1/1963 | Baker | 414/635 |
| 3,187,829 | 6/1965 | Ulinski | 180/19.1 |
| 3,227,300 | 1/1966 | Kampert | 414/635 |
| 3,235,110 | 2/1966 | Kleyser | 414/635 |
| 3,441,158 | 4/1969 | Wilson | 414/632 |
| 3,674,166 | 7/1972 | Danbar | 414/469 |
| 3,684,110 | 8/1972 | Meyercord | 414/546 X |
| 3,790,013 | 2/1974 | Smith | 414/469 X |
| 3,848,758 | 11/1974 | Carter | 414/469 |
| 4,241,803 | 12/1980 | Lauber | 280/765.1 X |
| 4,325,666 | 4/1982 | Chain et al. | 414/540 X |
| 4,621,972 | 11/1986 | Grotte | 414/469 X |
| 4,629,391 | 12/1986 | Soyk et al. | 180/19.1 X |
| 4,778,327 | 10/1988 | Tufenkian et al. | 414/540 X |
| 4,790,711 | 12/1988 | Calaway | 414/540 X |
| 4,820,110 | 4/1989 | Efird | 180/19.2 X |
| 4,963,070 | 10/1990 | Detrick | 414/492 |

FOREIGN PATENT DOCUMENTS

| | | | |
|---|---|---|---|
| 655565 | 7/1963 | Italy | 414/540 |
| 1370060 | 1/1988 | U.S.S.R. | 414/540 |
| 1253802 | 11/1971 | United Kingdom | 414/635 |

OTHER PUBLICATIONS

Brochure entitled "Multitow Electric Pallet Trucks" by Stokvis Multitor Corp, undated.

*Primary Examiner*—David A. Bucci
*Attorney, Agent, or Firm*—Evenson, Wands, Edwards, Lenahan & McKeown

[57] ABSTRACT

An apparatus and method for manipulating and transporting equipment such as electronic equipment racks is engageable with a rack in either its upright position or its horizontal position and is controllably positionable to rotate the engaged rack to a horizontal position for transport and vertical position for installation. The apparatus comprises a horizontal mainframe which is supported on casters and powered by a steerable pallet truck so as to be easily rollable and maneuverable. The mainframe supports a battery-powered drive unit coupled to a first piston manipulator, one end of which is pivotally attached to the mainframe and the other end of which is pivotally attached to a rotatable rack-support mast. The rack support mast unit contains a second piston manipulator one end of which is attached to the support mast and the other of which is attached to a translatable rack engagement subframe having an engagement footplate at one end of the rack support mast. The rack-support mast is pivotally attached to the mainframe so as to be rotatable between a horizontal position, at rest on the mainframe, and a vertical position, rotated 90° with respect to the mainframe, at which the support mast and its translatable foot may engage an upright equipment rack. The mainframe is further provided with a pair of stabilizer arms which pivot horizontally about the end of the mainframe or which can be retracted into and out of the mainframe whereat the support mast is rotatable to its vertical position.

7 Claims, 4 Drawing Sheets

POWER-DRIVEN ADJUSTABLE EQUIPMENT RACK CARRIER

CROSS-REFERENCE TO RELATED APPLICATIONS

This is a continuation-in-part of copending application Ser. No. 227,667, filed Aug. 2, 1988, now U.S. Pat. No. 4,963,070, issued Oct. 16, 1990.

FIELD OF THE INVENTION

The present invention relates in general to heavy duty hardware transport and positioning apparatus and is particularly directed to a power-driven apparatus for engaging a heavy appliance or hardware rack (such as that employed for housing electronic equipment components) in a either floor-mounted upright position or a horizontal, pallet-supported position, and controllably pivoting the engaged appliance or rack to facilitate transport and installation in an equipment room.

BACKGROUND OF THE INVENTION

In order to provide a secure and well protected support environment for the many delicate and sensitive components of electronic equipment, manufacturers and users typically house such components in a heavy duty steel cabinet or rack which, when fully loaded with instruments, signal processing units, power supplies, etc. can be expected to weigh in the neighborhood of two thousand pounds. This combination of weight and need for careful handling has made movement of such equipment a "back-straining" task for workers whose responsibility is the packing, transport and installation of heavy duty appliances and systems. In particular, in its manufactured (completed assembly) and installed configuration, an equipment rack is (floor) supported in a vertical, or upright, position. For transport, however, the rack must be carefully rotated or pivoted to a horizontal position (placed on its back). Because the location whereat the rack must be pivotally manipulated is typically within the interior of a building and is commonly a confined space, as well as the fact that the handling of the equipment requires considerably delicacy, the task has been labor intensive and has often resulted in back injuries to handling and transport personnel. Racks have been accidently dropped and several damaged using hand method and other sling or chain-ball arrangements.

My prior adjustable equipment rack carrier disclosed in the above-referenced U.S. Pat. No. 4,963,070 required the carrier to be manually rolled to the desired area by pushing on a U-shaped handle. I have found, however, that the manual rolling requires an unnecessary and undesirable exertion of force by the operator, particularly where the weight of the rack is not evenly distributed along the carrier or the carrier must traverse an incline or travel a long distance.

SUMMARY OF THE INVENTION

In accordance with the present invention, the manpower intensive requirements and potential back-strain hazards of conventional techniques for manipulating and transporting heavy duty equipment racks and appliances are obviated by a power driven transport apparatus that is engageable with the appliance or equipment rack in either its vertical/upright position or in its horizontal/transport position and is controllably positionable to pivot or rotate the engaged appliance or rack to horizontal position for transport and then return it to vertical position for installation.

For this purpose the apparatus according to the present invention is comprised of a horizontal mainframe which is supported on wheels or casters so as to be easily rollable on a horizontal or inclined surface. Supported on the mainframe are a hydraulic drive unit and attendant batteries therefor, coupled to a first piston manipulator, such as a hydraulically driven piston manipulator, one end of which is pivotally attached to the mainframe and the other end of which is pivotally attached to a rotatable rack-support mast. The rack support mast unit contains a second piston manipulator, again such as a hydraulically driven piston manipulator, one end of which is attached to the support mast and the other of which is attached to a translatable subframe having a rack engagement foot located at one end of the rack support mast. The rack-support mast is pivotally attached to the mainframe so as to be rotatable between a horizontal position, at rest on the mainframe, and a vertical position, rotated 90° with respect to the mainframe, at which the support mast and its translatable subframe may engage an upright equipment rack or appliance.

The mainframe is further provided with a pair of outrigger stabilizer arms which pivot horizontally about the end of the mainframe whereat the support mast is rotatable to its vertical position. These pivotable arms are employed to stabilize the apparatus during the rotation of the rack-support mast for loading and unloading a hardware rack. In its transport-mode configuration, the support mast is rotated to its horizontal position so as to be supported at rest on top of the mainframe. In order to engage an upright equipment rack, the first piston manipulator is driven to raise and rotate the support mast from the horizontal position to its vertical position. The translatable subframe is then vertically translated so that a transversely extended foot fits beneath and is urged against the bottom of the rack (or appliance). With a protective pad and support pallet vertically positioned on the subframe of support mast, the apparatus is moved into engagement with the back of the rack. Adjustable straps may then be placed around the support mast and the rack to secure the rack in place as the support mast is rotatably lowered to its rest horizontal position of the mainframe.

With the rack securely resting in its horizontal position the straps are removed and a packing crate (protective housing) is built about the rack on the support pallet. A handle-controlled electric pallet truck integrated with the carrier allows the apparatus to be power driven to the desired area. After the rack has been transported by rolling the apparatus to a loading area, the packing crate may be engaged by a fork lift for loading on a further transport vehicle (truck). At its delivery and installation point, the process is reversed so that the equipment rack may be placed upright.

DETAILED DESCRIPTION

Figure 1:
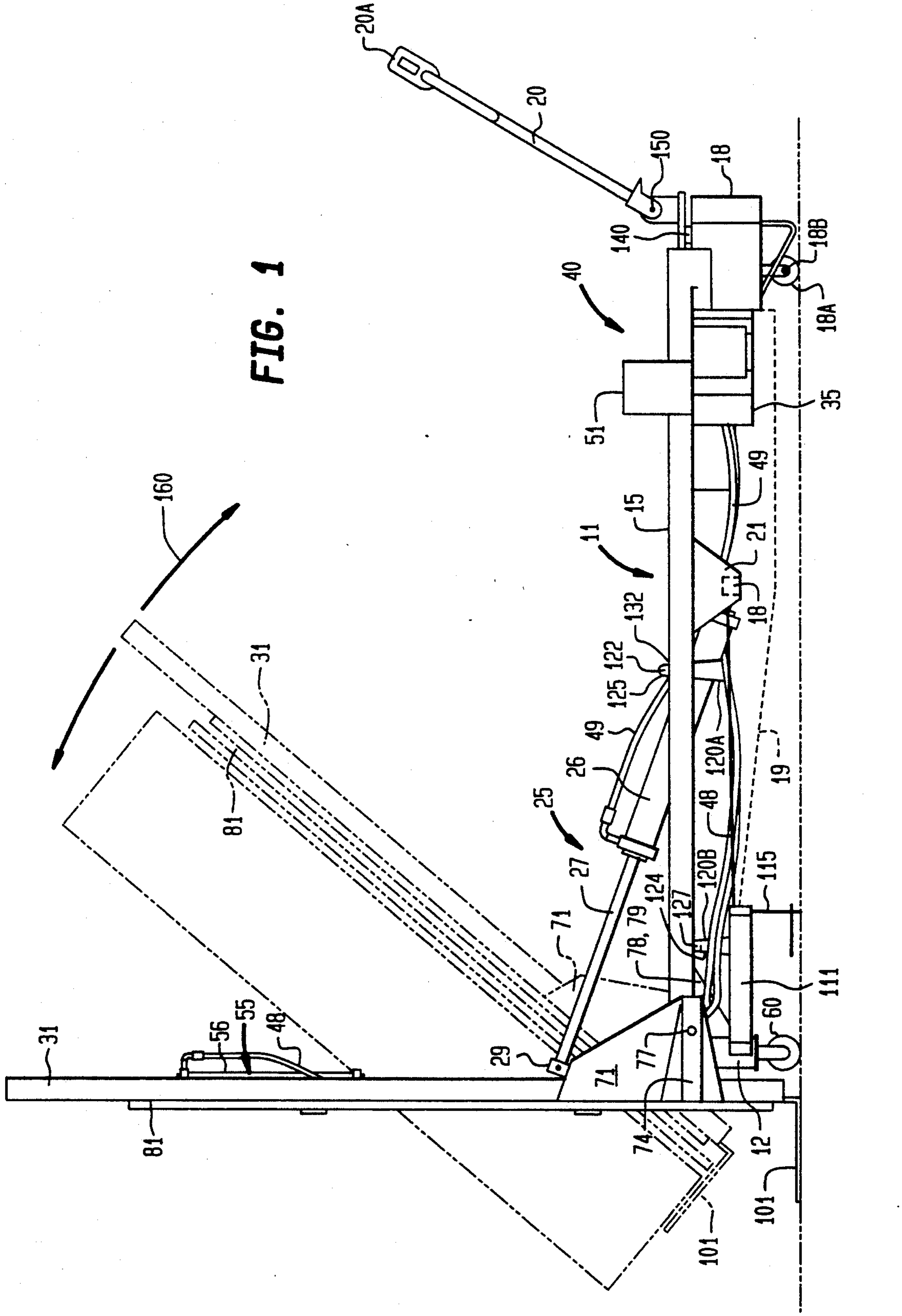
FIGS. 1–4 are respective diagrammatic side, plan, end and side-horizontal transport configuration views of the power-driven transport apparatus of the present invention.

Referring now to FIGS. 1–4, respectively, the transport apparatus is comprised of a generally rectangular mainframe 11 formed of a set of welded (steel) side rails 13 and 15 and horizontal cross-braces 14, 16 and 17 therebetween. Mainframe 11 is supported for rolling movement by a set of vertical leg 12 members welded thereto, to which respective casters 60 are attached. To facilitate rolling movement of the transport apparatus by moving personnel, a battery-operated, handle controlled pallet truck 18 is integrated into one end of the transport apparatus. This truck 18 is of the type marketed under the "MULTITON" trademark of Stokvis Multiton Corp. The handle 20 of the truck 18, is pivotable around a vertical axis 140 and also pivotable about a horizontal axis 150 to provide two degrees of steering freedom. The handle 20 also contains an easily accessible function control unit diagrammatically shown at 20A for "belly button" forward and reverse for smooth acceleration and fingertip steering, particularly when the carrier encounters inclines or must make a relatively tight turn. Steering can also take place while the carrier is stationary. One of the function controls can be for the operation of electromagnetic disc brakes, diagrammatically shown at 18B of a drive wheel 18A. The truck 18 can be operated by battery packs 36, 37 described below. A built-in charger (not shown) can also be included to allow batter recharging either at a permanent charging station or in a 110 volt outlet.

Welded to and extending beneath a central portion of mainframe 11 are a pair of generally trapezoidally shaped gussets 21 to which cross-brace 16 is welded. Alternatively, a skirt (dotted line 19) provided along almost the entire length of the side rails 13, 15 to provide a more streamlined-looking appearance for the carrier and to hide some of the exposed parts below the mainframe 11. In addition to providing rigidity to the rectangular mainframe, cross-brace 16 serves to pivotably anchor one end of a hydraulic drive unit 25, comprised of a cylinder 26 and a piston 27 by way of a pivot bracket 28 at the midpoint of cross-brace 16. The other end of drive unit 25, at the far end of piston 27, is rotatably attached to a mast 31 by way of a pivot bracket 29.

A power supply/piston drive (e.g. hydraulic or electrical) control supply support bracket 35 is welded to and extends beneath side rails 13 and 15 at the one end of the mainframe 11 whereat the pallet truck 18 is affixed. Bracket 35 serves to support the pair of batteries 36 and 37 which are normally covered but are shown exposed in the fragmentory top view in FIG. 2 and a control unit, such as a hydraulic control unit 40 including a hydraulic pump 41 and control valve 42 coupled thereto by way of supply hoses 46 and 47. Additional pairs of control hoses 48 and 49 extend to respective cylinders 26 and 56 of a pair of hydraulic control units 25 and 55.

Figure 4:
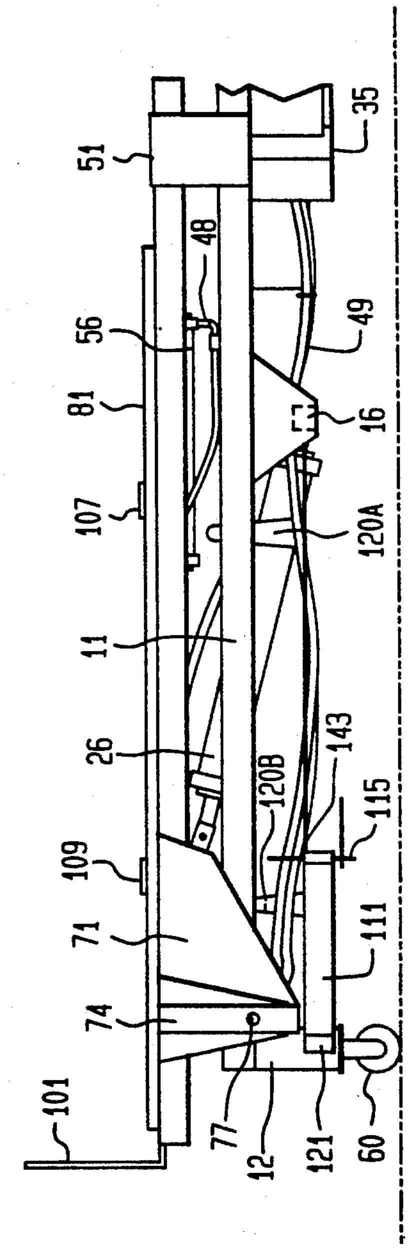

Also affixed to the side rails 13 and 15 of mainframe 11 are a pair of mast support brackets 51 and 52 which serve to receive and provide vertical support for a rotatable mast 31, shown in its horizontal transport position in FIG. 4 (in which the right-end of the apparatus with the motorized pallet truck is not again showing) and in its vertical or upright position (solid lines) and an intermediate position (dash lines) in FIG. 1.

Figure 3:
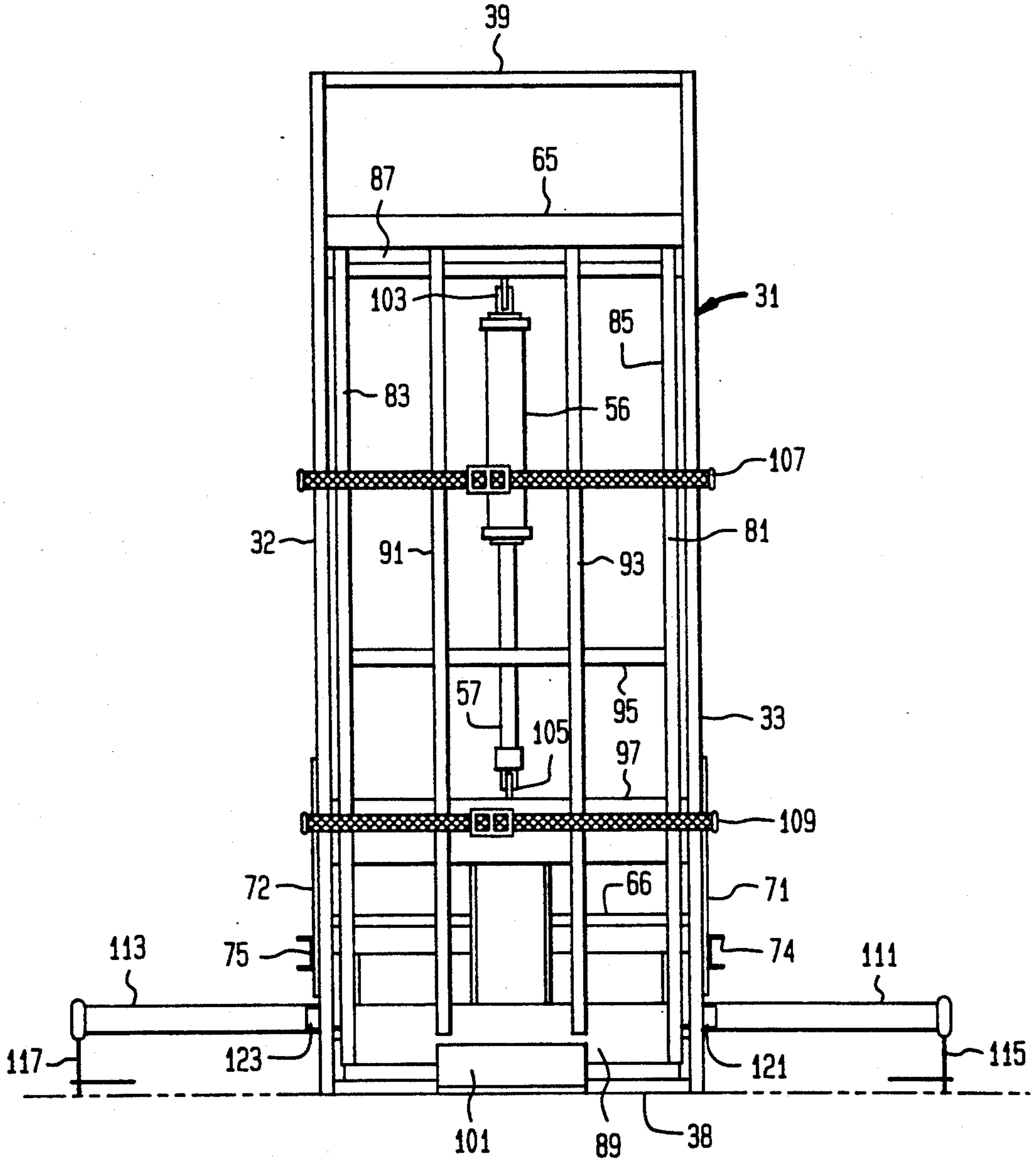

The rotatable mast 31, shown in greater detail in FIG. 3, is comprised of a generally rectangular frame having a pair of U-shaped side channels 32 and 33 and end channel members 38 and 39 welded to opposite ends thereof. Welded to the interior U-shaped cross-section of side channels 32 and 33 are respective cross-brace plates 65 and 66. A pair of polygonally-shaped side gussets 71 and 72 are welded to the outer end surfaces of the side channels 32 and 33 of the mast 31 and include respective generally U-shaped reinforcing channel members 74 and 75 welded thereto. As shown in FIGS. 1 and 4, a horizontal extending rod 77 extends through an aperture in each of channel members 74 and 75 and through corresponding openings or slots in a pair of gussets 78 and 79 of mainframe 11, so as to provide a rotatable support axis for enabling the mast 31 to be controllably rotated between its upright or vertical position (shown in solid lines in FIG. 1) and its horizontal transport position (shown in FIG. 4).

Slidably mounted on the rotatable mast 31 is a subframe 81 comprised of a pair of side rails 83 and 85 and endplates 87 and 89. A pair of longitudinally extending brace members 91 and 93 are welded to each of endplates 87 and 89 and to a pair of transversely extending reenforcing plates 95 and 97, as shown in FIG. 3. The width of plate 97 is such as to extend into and be slidable within U-shaped side channels 32 and 33 of mast 31. An L-shaped foot plate 101 is welded to lower end plate 89. The shape, width and depth of foot plate 101 permit it to pass beneath a typical appliance or equipment rack, so that it may be engaged by the vertical translation of subframe 81. Foot plate 101 may be a continuous piece or configured as a fork, for example.

The translation of subframe 81 is controlled by way of hydraulic control unit 55, comprised of a cylinder 56 and a longitudinally displaceable piston 57. Cylinder 56 is pivotally attached to a fixed plate 87 of mast 31 by way of a pivot bracket 103 and is pivotally attached to translatable support plate 97 of subframe 81 by way of a pivot bracket 105.

A pair of (nylon) securing straps 107 and 109 are fastened to the outer side rails 32 and 33 of mast 31, to permit an equipment rack, or heavy appliance, once engaged by mast 31 and the associated translatable subframe 81, to be securely bound to and retained thereby.

To provide stability to the transport apparatus during the course of engagement with an equipment rack and the rotation of the equipment rack into its horizontal position upon the mainframe, a pair of pivotable outrigger side arms 111 and 113, having adjustable footers 115 and 117, respectively, may be pivotally attached at pivot joints 121 and 123 to the caster support leg members 12. Alternatively, the footers can be arranged in the skirt 19 (shown in dashed lines in FIG. 1) from which they can be extended.

Figure 2:
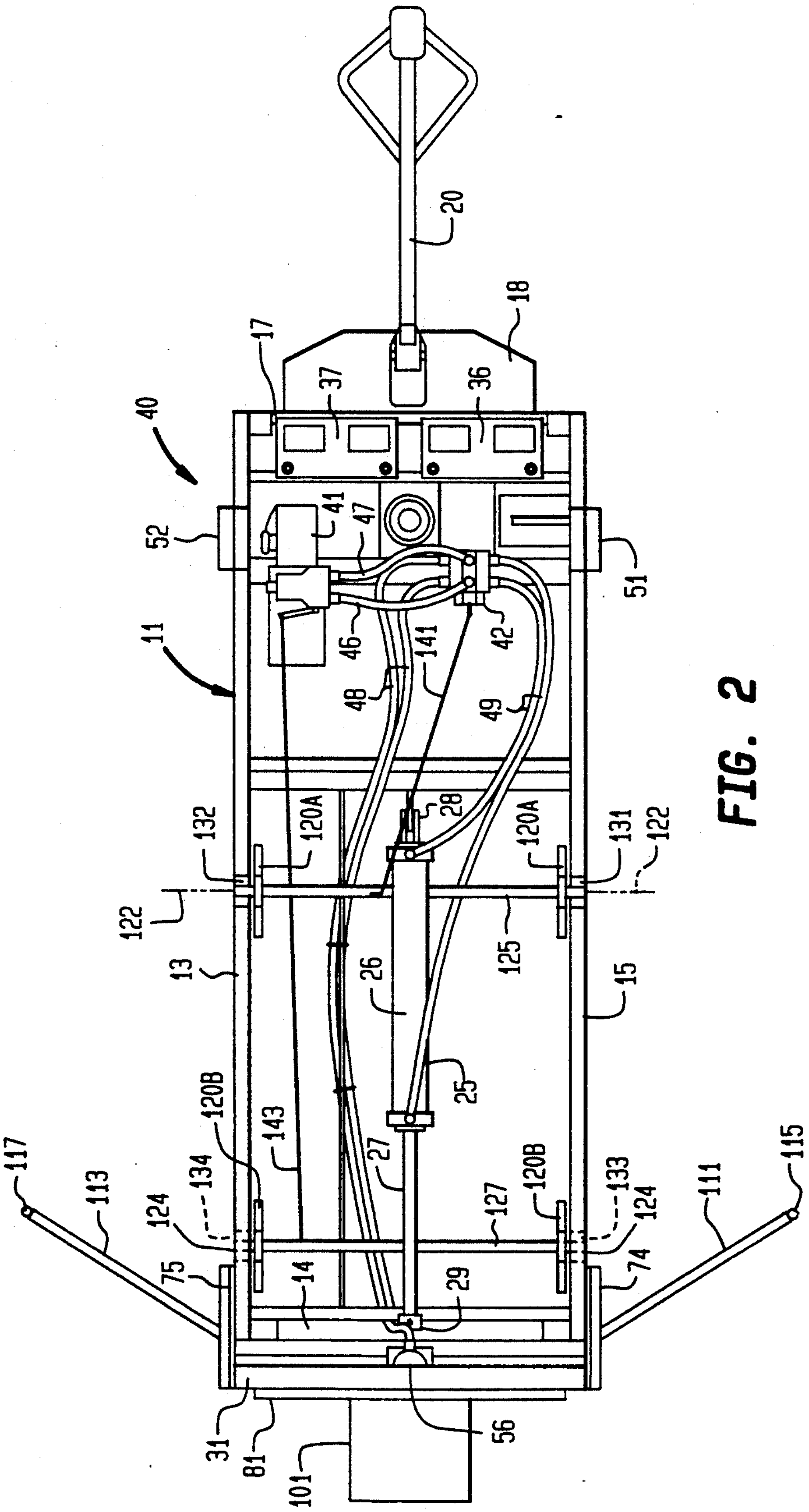

Control of the operation of hydraulic drive units 25 and 50 can be effected by way of a pair of generally inverted-shaped foot control treadles 120A and 120B which are rotatable about respective axes 122 and 124 of a pair of rods 125 and 127, respectively rotatably attached to mainframe 11 by way of sets of U-shaped clamps 131, 132 and 133, 134, respectively, as shown in FIG. 2. Each of the respective rods 125 and 127 of foot control treadles 120A and 120B is coupled to a respective control rod 141 and 143, for operating control valve 42 and hydraulic pump 41, respectively. Such rod control mechanisms and the operation of the pump and control valves are conventional and will not be described in further detail here. It is noted, however, that control of the valve 42 and pump 41 can be effected by appropriate controls on the handle 20 of the pallet truck 18 and/or through a portable unit (not shown) which allows actuation by the operator at any position around the carrier.

In operation, let it be assumed that an equipment rack (such as a vertically extending electronic equipment rack or magnetic tape buffer) or an appliance such as a refrigerator or freezer, is to be seized and transported by the transport apparatus. In its stable, at rest condition, the hardware unit to be seized is in a substantially vertical or upright orientation. The transport apparatus, when power wheeled to the site, absent any equipment, will be configured in the manner shown in FIG. 4, wherein hydraulic drive unit 55 has been operated to cause piston 57 to be drawn into cylinder 56 and thereby cause the mast 31 to rotate about axis 77 along the direction of arrows 160 in FIG. 1, to bring the mast 31 at rest atop the support brackets 51, 52 of the mainframe 11.

The transport apparatus is then rolled up to the equipment of interest and a freight pallet and protective pad is placed upon translatable subframe 81, to receive the back of the equipment to be engaged. (It should be noted that the securing straps 107 and 109 are unbound at this time.)

Next, through the operation of foot treadles 120A and 120B, or a remote control unit or the handle 19, the hydraulic drive unit 55 is engaged to cause a rotation of the mast 31 from its horizontal position, shown in FIG. 4, to its vertical solid line position, shown in FIG. 1. The hydraulic drive unit 25 is then operated to vertically translate subframe 81 to a position such that the footplate 101 is located so that it will fit beneath the equipment rack. The transport apparatus is then pushed up against the equipment rack with the back of the rack abutting against the protective padding and freight pallet that has been placed upon subframe 81. Hydraulic drive unit 25 is then operated to raise the subframe 81 and cause the footplate 101 to abut against the bottom of the equipment rack.

Straps 107 and 109 are now wrapped around the equipment rack for security. In addition, outrigger stabilizing arms 111 and 113 are extended to prevent any side rolling movement of the subframe. Due to the weight of the pallet truck 18, a counterweight need not be placed at the end of mainframe 11, so as to provide a balancing/stabilizing force at the end of the mainframe opposite the end at which the equipment rack is to be engaged.

With the equipment rack securely engaged with the support mast 31, the hydraulic drive unit 55 is operated to cause the mast 31 to rotate from its vertical position shown in FIG. 1, to its horizontal position, shown in FIG. 4, along rotational arrows 160, as shown in FIG. 1.

With the support mast 31 coming to rest against support brackets 51 and 52 of mainframe 11, the hardware unit is now ready for transport. Stabilizing side arms 111 and 113 are rotated from their extended position to their parallel longitudinal travelling position (or, alternatively, are retracted into the skirt 19) adjacent to the side rails 13 and 15 of the mainframe, as the vertically extendable footers 115, 117 are withdrawn from engagement with the floor. The transport apparatus may now be rolled and easily steered from its equipment rack seizing position to a loading position (for example, at a transport dock) by actuating the pallet truck controls of handle unit 20A on the handle 20 whereat a protective housing in the form of a packing crate may be built up about the hardware equipment rack, which now rests on its back on a pallet on support mast 31 over the mainframe 11. With the straps 107 and 109 removed and the transport crate built up around the hardware rack, a conventional loading mechanism, such as a fork lift, may be eased beneath the supporting pallet which rests atop the horizontally oriented support mast 31. The width of footplate 101, in addition to permitting the footplate to readily fit beneath the equipment rack, also permits the ready passage of the fork tongs of the fork lift into engagement with the support pallet of the hardware rack. The crated hardware rack may then be simply lifted off the transport apparatus and safely and securely loaded onto a further transport vehicle, such as a truck.

Because the support mast 31 both rotatable (between vertical and horizontal positions) and includes a translatable subframe, engagement and seizure of a heavy equipment rack can be easily accomplished by the operation of hydraulic units 25 and 55, without subjecting the mover personnel to a risk of (back) injury.

In the foregoing description, each of drive units 25 and 55 is hydraulically powered. It should be observed, however, that other types of drives, such as electrically driven pistons may be employed in their place.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

I claim:

1. A power-driven, floor-rollable, electronic equipment rack transport apparatus comprising:

a first, generally horizontally extending, support frame, sized to accommodate an electronic equipment rack and supported for rolling and steered movement on a surface by way of a steered wheel and plurality of casters attached thereto;

a second support frame pivotally attached to said first end of said first support frame, so as to be rotatable between a first, horizontal position, at rest on said first support frame, and a second, vertical position adjacent to said first end of said first support frame;

a translatable subframe, having a footmember at one end thereof, supported by said second support frame, so as to be translatable along said second support frame in the direction in which said second support frame is oriented with respect to said first support frame;

a first electrically-powered piston unit, pivotally attached to said first and second support frames, for controllably rotating said second support frame about its pivotal attachment to said first support frame;

a second electrically-powered piston unit attached to said translatable subframe and said second support frame for translatably adjusting the position of said subframe along said second support frame;

an electrical power supply support bracket, mounted to a second end of said first support frame, for supporting an electrical power supply unit for operating said first and second electrically-powered piston units;

means coupled to said second end of said first support frame for providing motive power for rolling along the surface and for providing a balancing, stabilizing force at the second end of the said first support frame opposite to the first end thereof at which an electronic equipment rack is engaged by said translatable subframe supported on said second support frame; and a control handle coupled to the motive power means for controlling the operation of said motive power means.

2. A transport apparatus according to claim 1, further including a plurality of stabilizer arm members pivotally attached to said first support frame, so as to be horizontally rotatable with respect thereto and thereby provide stabilizing support for said apparatus.

3. A transport apparatus according to claim 1, wherein said control handle is pivotable around a vertical axis and a horizontal axis relative to the motive power means for steering the transport apparatus and contains function controls for effecting forward motion, reverse motion and braking of said motive power means.

4. A method of securing and transporting an electronic equipment rack which houses electronic components comprising the steps of:

(a) rolling and steering, as necessary, along a surface to a location of said electronic equipment rack at rest in its upright position, by actuation of a movement control handle of a transport apparatus, which transport apparatus comprises a first, generally horizontally extending, support frame, sized to accommodate an electronic equipment rack and supported for rolling and swivel movement on a surface by way of a steered wheeled and plurality of casters attached thereto, a second support frame pivotally attached to first end of said first support frame, so as to be rotatable between a first, horizontal position, at rest on said first support frame, and a second, vertical position adjacent to said first end of said first support frame, a translatable subframe, having a footmember at one end thereof, supported by said second support frame, so as to be translatable along said second support frame in a direction in which said second support frame is oriented with respect to said first support frame, a first electrically-powered piston unit, pivotally attached to said first and second support frames, for controllably rotating said second support frame about its pivotal attachment to said first support frame, a second electrically-powered piston unit attached to said translatable subframe and said second support frame for translatably adjusting the position of said subframe along said second support frame, an electrical power supply support bracket mounted to a second end of said first support frame for supporting an electrical power supply unit for operating for said first and second electrically-powered piston units, and means, coupled to said second end of said first support frame, for providing steered motive power via a movement control handle and a balancing, stabilizing force at the second end of said first support frame opposite to the first end thereof at which an electronic equipment rack is engaged by said translatable subframe supported on said second support frame;

(b) controllably actuating said first and second electrically-powered piston units as necessary to bring said second support member into a vertical orientation, adjacent to one side of said electronic equipment rack and said subframe at a location that will enable said foot member to fit beneath and engage a bottom support location of said electronic equipment rack;

(c) bringing said transport apparatus into engagement with said electronic equipment rack such that said electronic equipment rack is mechanically coupled to said subframe of said second support frame and said foot member is mechanically coupled to said bottom support location of said electronic equipment rack;

(d) actuating said first electronically-powered piston unit so as to rotate said second support frame and thereby said electronic equipment rack from its upright orientation to a generally horizontal orientation, resting atop said first support frame; and (e) power moving and steering, as necessary, by actuation of the movement control handle, said transport apparatus, along said surface to thereby transport said electronic equipment rack oriented in a generally horizontal position with said second support frame.

5. A method according to claim 4, wherein step (c) includes the step of binding said electronic equipment rack to said second support frame, by way of binding attachment members.

6. A method according to claim 5, wherein step (c) includes the step of placing a support pallet upon said second support frame prior to mechanically engaging said second support frame with said electronic equipment rack, so that, upon actuating said first and second electrically-powered piston units in step (d), said electronic equipment rack will be supported by said pallet on said second support frame.

7. A method according to claim 6, further including the step of:

(f) prior to step (e), constructing a protective housing about said electronic equipment rack.

* * * * *